United States Patent [19]

Shaw

[11] 3,872,054

[45] Mar. 18, 1975

[54] FLAME RETARDANT ROOM TEMPERATURE VULCANIZING ORGANOPOLYSILOXANE COMPOSITION

[75] Inventor: Harvey P. Shaw, Troy, N.Y.

[73] Assignee: General Electric Company, Waterford, N.Y.

[22] Filed: Nov. 26, 1971

[21] Appl. No.: 202,554

[52] U.S. Cl. ... 260/45.7 R, 260/37 SB, 260/46.5 Y, 260/650 R
[51] Int. Cl. ............................................. C09k 3/28
[58] Field of Search ........ 260/37 SB, 45.7 R, 650 R

[56] References Cited
UNITED STATES PATENTS

| | | | |
|---|---|---|---|
| 2,028,715 | 1/1936 | Hanson | 252/8.1 |
| 2,952,712 | 9/1960 | Roberts et al. | 260/650 |
| 3,154,515 | 10/1964 | Berridge | 260/33.8 |
| 3,296,161 | 1/1967 | Kulpa | 260/18 |
| 3,403,036 | 9/1968 | Hindersinn et al. | 106/18 |
| 3,422,048 | 1/1969 | Cannelongo | 260/28.5 |
| 3,441,524 | 4/1969 | Burger et al. | 260/2.5 |
| 3,455,873 | 7/1969 | Jenkner | 260/45.7 |
| 3,519,597 | 7/1970 | Weil et al. | 260/45.75 |
| 3,560,580 | 2/1971 | Burk | 260/650 |
| 3,635,874 | 1/1972 | Laur et al. | 260/37 |
| 3,711,563 | 1/1973 | Carlson et al. | 260/649 |

*Primary Examiner*—Donald E. Czaja
*Assistant Examiner*—R. A. White
*Attorney, Agent, or Firm*—Donald J. Voss, Esq.; George B. Finnegan, Jr.; Rocco S. Barrese

[57] ABSTRACT

Composition convertible to the solid cured elastic state upon exposure to moisture comprising room temperature vulcanizing silicone elastomer and an effective flame retardant amount of certain halogenated organic compounds.

7 Claims, No Drawings

FLAME RETARDANT ROOM TEMPERATURE VULCANIZING ORGANOPOLYSILOXANE COMPOSITION

BACKGROUND OF THE INVENTION

This invention relates to organopolysiloxanes which are capable of curing at room temperature to rubbery materials and in particular this invention is directed to materials commonly referred to as room temperature vulcanizing silicones which cure at room temperature upon exposure to moisture commonly present in the atmosphere.

These room temperature vulcanizing silicone rubbers are known in the art and are described, among other places, in U.S. Pat. Nos. 3,035,016, 3,077,465, 3,105,061, 3,133,891, and 3,296,161. These materials generally are prepared by mixing an organopolysiloxane, which is primarily a diorganopolysiloxane, containing silicon-bonded hydroxyl or alkoxy groups with an organo silicate or with an organotriacyloxysilane either in the presence or absence of added fillers and added vulcanization accelerators.

However, the manufacture of room temperature vulcanizing silicone elastomers which are flame retardant is quite difficult and has presented a continuing problem for the silicone industry. Finding an effective flame retardant for such compositions is difficult, for instance, since the alkyltriacyloxysilanes which may be present, deleteriously effect the flame retardant properties of various flame retardants which have been employed in heat curable siloxanes. Accordingly, the presence of the alkyltriacyloxysilanes greatly reduces the effectiveness of such flame retardants. Moreover, various flame retardants previously employed adversely interfere with the cure mechanism.

Various attempts to solve this flame retardancy problem have been suggested. However, such prior attempts have not been completely satisfactory. In particular, various prior attempts to impart flame retardancy to room temperature vulcanizing silicone elastomers are etremely expensive. In addition, such prior attempts generally require at least two different additives to provide flame retardancy.

It is an object of the present invention to provide an improved room temperature vulcanizing silicone elastomer.

It is a further object of the present invention to provide a room temperature vulcanizing silicone rubber of improved flame retardancy.

The present invention makes it possible to obtain flame retardant room temperature vulcanizing silicone compositions with only one flame retardant additive.

SUMMARY OF INVENTION

Composition convertible to the solid cured elastic state upon exposure to moisture comprising:

A. a substantially liquid organopolysiloxane having a viscosity of from 200 to 500,000 centistokes containing an average of from 1.85 to 2.02 silicon-bonded organic groups per silicon atom, and containing from 0.02 to 2.0 mole percent silicon-bonded hydroxyl and/or alkoxy groups;

B. an organotriacyloxysilane having the formula, $$R''Si(OY)_3,$$

wherein R'' is selected from the class of monovalent hydrocarbon radicals, halogenated monovalent hydrocarbon radicals, and cyanoalkyl radicals, and Y is selected from the class consisting of a saturated aliphatic monoacyl radical of a carboxylic acid, and an alkyl radical of up to 10 carbon atoms; and C. an effective flame retardant amount of a halogenated organic compound containing a ratio of 4 bromine atoms to 6 chlorine atoms, and a total halogen content of about 76.9 weight percent.

DESCRIPTION OF PREFERRED EMBODIMENTS

The organopolysiloxanes employed in the practice of the present invention are well known in the art and form the "base polymer" for the room temperature vulcanizing silicone rubbers of the invention. These base polymers, which can comprise a single species or a plurality of species, are liquids having a viscosity of from about 200 to 500,000 centistokes at 25°C, which contain an average of from about 1.85 to 2.02 silicon-bonded organic radicals per silicon atom, with the organic radicals being selected from the class consisting of monovalent hydrocarbon radicals, halogenated monovalent hydrocarbon radicals and cyanoalkyl radicals, with the organic radicals being attached to silicon through silicon-carbon linkages and with there being present in the base polymer from about 0.02 to 2.0 mole percent silicon-bonded hydroxyl groups or alkoxy groups.

Generally speaking these compositions comprise primarily diorganosiloxane units, but can also contain minor amounts of monoorganosiloxane units and triorganosiloxane units. One particularly useful type of liquid organopolysiloxane base polymer is the material having the formula:

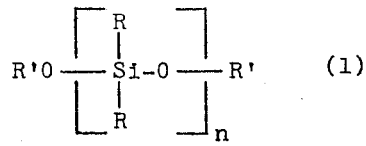

(1)

where R is a member selected from the class consisting of monovalent hydrocarbon radicals, halogenated monovalent hydrocarbon radicals and cyanoalkyl radicals and n has a value of at least 5, e.g., from about 20 to 3,000 or more, and R' is selected from the group of hydrogen and alkyl. The liquid organopolysiloxane within the scope of Formula (1) can comprise a variety of molecules of different molecular weights and of different R and R' substituents so long as the average formula of the reaction mixture falls within the scope of Formula (1).

In addition to the linear silanol or alkoxy chain-stopped diorganopolysiloxanes of Formula (1), the base polymer can also contain some molecules containing linear diorganosiloxane chains which are terminated at one end with triorganosiloxane units having the formula:

$$(R)_3SiO_{0.5}$$

(2)

with the other end of the chains being terminated by alkoxy or silanol groups, where R is as previously defined. The polymer chains can also contain some molecules containing monoorganosiloxane units having the formula:

$$RSiO_{1.5}$$

(3)

where R is as previously defined. In any case, it is necessary that the fluid organopolysiloxane base polymer have a viscosity in the range of from about 200 to 500,000 centistokes as previously described and preferably in the range of from about 2,000 to 50,000 centistokes at 25°C, with the amount of silicon-bonded hydroxyl and or alkoxy groups being equal to at least about from 0.02 to 2.0 mole percent. These various liquid organopolysiloxanes are well known in the art and their preparation need not be described in the present application.

Illustrative of the groups for R of the fluid organopolysiloxane are, for example, alkyl radicals, e.g., methyl, ethyl, propyl, butyl, octyl, etc., radicals; aryl radicals, e.g., phenyl, naphthyl, tolyl, etc., radicals; aralkyl radicals, e.g., benzyl, phenylethyl, etc., radicals; alkenyl radicals, e.g., vinyl, allyl, etc., radicals; cycloaliphatic hydrocarbon radicals, e.g., cyclohexyl, cycloheptyl, cyclohexenyl, etc., radicals; various halogenated monovalent hydrocarbon radicals, such as, for example, chooromethyl, alpha-chloroethyl, beta-chloroethyl, chlorophenyl, dibromophenyl, trifluoromethylphenyl, trifluoromethylpropyl, etc., radicals; as well as cyanoalkyl radicals, such as, for example, cyanomethyl, beta-cyanoethyl, beta-cyanopropyl, gamma-cyanopropyl, omega-cyanobutyl, etc., radicals.

The preferred organo radicals represented by R in the fluid organopolysiloxanes employed in the practice of the present invention are phenyl, vinyl, and methyl. R' of the fluid organopolysiloxanes of Formula (1) is hydrogen or an alkyl group such as methyl, ethyl, propyl, t-butyl, octyl, hexyl, and stearyl. Preferably R' is hydrogen or t-butyl.

Organotriacyloxysilanes which may be employed in admixture with the organopolysiloxanes of Formula (1) to provide the room temperature vulcanizing elastomers have the formula:

(4)

where R'' is a member selected from the class consisting of monovalent hydrocarbon radicals, halogenated monovalent hydrocarbon radicals, and cyanoalkyl radicals and Y is selected from the class consisting of a saturated aliphatic monoacyl radical of a carboxylic acid and aliphatic hydrocarbon radical of up to 10 carbon atoms and preferably an alkyl radical of 1–10 carbon atoms.

The R'' group of Formula (4) is of the same scope as described for the R groups of the fluid organopolysiloxane. Illustrative of the groups previously defined as selected from the class consisting of monovalent hydrocarbon radicals, halogenated monovalent hydrocarbon radicals and cyanoalkyl radicals for R'' of the organotriacyloxysilane of Formula (4) are, for example, alkyl radicals, e.g., methyl, ethyl, propyl, butyl, octyl, etc., radicals; aryl radicals, e.g., phenyl, naphthyl, tolyl, etc., radicals; aralkyl radicals, e.g., benzyl, phenylethyl, etc., radicals; alkenyl radicals, e.g., vinyl, allyl, etc., radicals; cycloaliphatic hydrocarbon radicals, e.g., cyclohexyl, cycloheptyl, cyclohexenyl, etc., radicals; various halogenated monovalent hydrocarbon radicals, such as, for example, chloromethyl, alpha-chloroethyl, beta-chloroethyl, chlorophenyl, dibromophenyl, trifluoromethylphenyl, trifluoromethylpropyl, etc., radicals; as well as cyanoalkyl radicals, such as, for example, cyanomethyl, beta-cyanoethyl, beta-cyanopropyl, gamma-cyanopropyl, omega-cyanobutyl, etc. radicals.

Preferably R'' is a lower alkyl radical, such as methyl, ethyl, propyl, butyl, octyl, etc., or is a simple aryl radical, such as phenyl or tolyl. The acyl radical represented by Y is represented by such groups as formyl, acetyl, propionyl, butyryl, hexoyl, 2-ethylhexoyl, octanoyl, isovaleryl, and stearyl, methyl, ethyl, propyl, t-butyl, etc. The preferred Y radical is acetyl. The preferred specific composition within the scope of Formula (4) is methyltriacetoxysilane.

The material which is employed in the present invention to render the composition flame retardant is a halogenated organic compound containing a ratio of 4 bromine atoms to 6 chlorine atoms and a total halogen content of about 76.9 weight percent. This material is commercially available under the trade designation of Dechlorane 604 from the Industrial Chemicals Division of Hooker Chemical Corporation, Niagara Falls, N.Y. 14302. According to the manufacturer this material, Dechlorane 604, has the following properties:

Physical properties

| | |
|---|---|
| Appearance | White free-flowing crystalline powder |
| Melting point, °C (°F) | 179 (354) |
| Density, gm/cc at 20°C | 2.37 |
| Vapor pressure, mm Hg at 139°C | 0.0014 |
| Solubility | |

| Solvent | Grams of Dechlorane 604/100 ml of solvent at 25°C |
|---|---|
| Benzene | 0.23 |
| Xylene | 0.18 |
| Methylene Chloride | 0.15 |
| Heptane | Insoluble |
| Methyl Ethyl Ketone | 0.07 |
| Isopropyl Alcohol | Insoluble |
| Carbon Tetrachloride | 0.13 |
| Acetylene Tetrachloride | 0.16 |

In addition, an elemental analysis was run to further identify Dechlorane 604. The results of that analysis are as follows:

| | |
|---|---|
| Weight % Carbon | 23.06 |
| Weight % Hydrogen | 0.53 |
| Weight % Chlorine | 28.78 |
| Weight % Bromine | 43.60 |

In view of the above information it is estimated that Dechlorane 604 may contain carbon, hydrogen, chlorine, and bromine in the following ratio: 12:4:6:4. According to the manufacturer, the Dechlorane 604 is an adduct of $Cl_6C_5$, and contains bromine substituted aromatic ring. Tests conducted on rats indicate that Dechlorane 604 may be relatively non-toxic by oral ingestion and non-irritating to the skin. It may be slightly irritating to the eyes.

The relative amounts of the organopolysiloxane base polymer, the organotriacyloxysilane or organosilicate, and the flame retardant compound employed in producing compositions which, upon exposure to moisture, cure to the solid, elastic state, vary within fairly broad limits. Generally, the amount of organotriacyloxysilane of formula (4) or silicate is from about 1.8 to 6.0 parts per 100 parts of the base polymer.

The amount of the flame retardant usually can be as low as about 5 per 100 parts of base polymer. Also usually about 100 parts of flame retardant per 100 parts of base polymer are more than sufficient to provide adequate flame retardancy for most applications of the composition. It is of course understood that higher or lower amounts of flame retardant can be used depending upon such factors as the desired amount of flame retardancy and the environment of use of the material.

The room temperature vulcanizing silicone rubber compositions of the present invention are prepared by simply mixing the liquid organopolysiloxane base polymer with the organotriacyloxysilane or silicate, and the halogenated organic flame retardant. Since the organotriacyloxysilane tends to hydrolyze upon exposure to the atmosphere care is exercised to exclude moisture during the mixing of the several components. Likewise, care should be taken that the mixture of the organopolysiloxane base polymer, the organotriacyloxysilane is maintained under substantially anhydrous conditions if it is desired to store the mixture for an extended period of time in a liquid state prior to conversion of the material to the cured, solid, elastic silicone rubber state. On the other hand, if it is desired to permit the mixture to cure immediately upon addition of the organotriacyloxysilane or silicate to the liquid organopolysiloxane no special precautions need be taken and the two materials can be merely mixed and placed in the form or shape which it is desired for the material to be cured.

The temperature at which the organotriacyloxysilane of Formula (4) is added to the reaction mixture is generally immaterial, with the addition generally being effected at a temperature of from about 20° to 80°C.

Compositions prepared by mixing the flame retardant and the organotriacyloxysilane with the base polymer can be used without further modification in any sealing, caulking or coating application by merely placing the composition in the desired place and permitting it to cure upon exposure to the moisture present in the atmosphere. Upon exposure of such compositions to atmospheric moisture, even after storage for times as long as two years or more, a hard "skin" will form on a composition shortly after exposure and complete cure to the rubbery state will have been effected within about 24 hours, all at room temperature. The time required for the formation of such skin is generally on the order of 30 minutes.

It is often desirable to modify the compositions of the present invention by addition of various materials which act as extenders or which change various properties, such as cure rate, color, or cost. For example, if it is desired to reduce the time required for complete cure by a factor of from about 2 to 5 without affecting the work life of the room temperature vulcanizing composition, the composition can be modified by the incorporation of a minor amount of a carboxylic acid salt of a metal ranging from lead to manganese, inclusive, in the electromotive series of metals. The particular metals included within this scope are lead, tin, nickel, cobalt, iron, cadmium, chromium, zinc and manganese. The specific metal ion which is preferred is tin. The carboxylic acids from which the salts of these metals are derived can be monocarboxylic acids or dicarboxylic acids and the metallic salts can be either soluble or insoluble in the organopolysiloxane. Preferably, the salts employed are soluble in the organopolysiloxane since this facilitates the uniform dispersion of the salt in the reaction mixture.

Illustrative of metal salts which can be employed in the practice of the present invention are, for example, zinc naphthenate, lead naphthenate, cobalt naphthenate, iron 2-ethylhexoate, cobalt octoate, zinc octoate, lead octoate, chromium octoate and tin octoate. Metal salts operative in the practice of the present invention include those in which the metallic ion contains a hydrocarbon substituent, such as, for example, carbomethoxyphenyl tin trisuberate, isobutyl tin triceroate, cyclohexenyl lead triacotinate, xenyl lead trisalicylate, dimethyl tin dibutyrate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bis-trichlorobenzoate, diphenyl lead diformate, dibutyl tin dilactate, dicyclopentyl lead bis-monochloroacetate, dibenzyl lead di-2-pentanoate, diallyl lead di-2-hexenoate, triethyl tin tartrate, tributyl tin acetate, triphenyl tin acetate, tricyclohexyl tin acrylate, tritolyl tin terephthalate, tri-n-propyl lead acetate, tristearyl lead succinate, trinapthyl lead p-methylbenzoate, tris-phenyl lead cyclohexenyl acetate, triphenyl lead ethylmalonate, etc.

The amount of the metal salt of the organic carboxylic acid which can be employed in the practice of the present invention is a function of the increased rate of curing desired so that any amount of such salt up to the maximum effective amount for increasing the cure rate can be employed. In general, no particular benefit is derived from employing more than about 5 percent by weight of such metal salt based on the weight of the organopolysiloxane base polymer. Preferably, where such metal salt is employed, it is present in an amount equal to from about 0.01 to 2.0 percent by weight, based on the weight of the base polymer.

The compositions of the present invention can also be varied by the incorporation of various extenders or fillers. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. When fillers are added to the compositions of the present invention, they are generally employed in amounts of from about 10 to 300 parts filler per 100 parts of the organopolysiloxane base polymer.

In addition to the modification of the compositions of the present invention by the addition of metal salt cure accelerators and fillers, these compositions can also be modified by the incorporation of various stabilizing agents and plasticizers. Moreover, such materials as the dialkoxydiacyloxysilanes set forth in U.S. Pat. No. 3,296,161 to Kulpa can be employed in the compositions of the present invention. Such dialkoxydiacyloxysilanes have the formula:

(7)

where $R^r$ is a lower alkyl radical and Y is a saturated aliphatic monoacyl radical of a carboxylic acid.

In formula (7), the group represented by $R^r$ is a lower alkyl radical, by which is meant an alkyl radical containing from 1 to 8 carbon atoms such as, for example, methyl, ethyl, propyl, butyl, t-butyl, hexyl, octyl, 2-ethyl hexyl, etc., radicals. The acyl radical represented by Y is a saturated aliphatic monoacyl radical of a carboxylic acid. Illustrative of the desired radical are those in which the acyl radical contains up to 4 carbon atoms, such as formyl, acetyl, propionyl, and butyryl radicals. However, the acyl groups can also be represented by groups such as hexoyl, 2-ethyl hexoyl, octanoyl, isovaleryl, and stearyl. Illustrative of specific silicones within Formula (7) can be mentioned, for example, dimethoxydiformoxysilane, diethoxydiformoxysilane, dipropionoxydiacetoxysilane, di-t-butoxydiacetoxysilane, di-2-ethylhexoxydioctanolsilane, etc.

Where the compositions of the present invention contain components other than the organotriacyloxysilane of Formula (4), the flame retardant, and the base polymer, the various ingredients can be added in any desired order. However, for ease of manufacturing it is often convenient to form a blend or mixture of all of the components of the room temperature vulcanizing organopolysiloxane except the dialkoxydiacyloxysilane, if present, and the organotriacyloxysilane, to then remove moisture from the resulting mixture by maintaining the mixture under vacuum, and thereafter to add the dialkoxydiacyloxysilane, if desired, and the organotriacyloxysilane prior to packaging of the compositions in containers protected from moisture. In addition to more conventional containers for bulk amounts of these materials, the materials can be packaged for convenient usage in caulking cartridges, squeeze tubes, and the like. Of course, where it is desired to permit the curable composition to cure immediately upon formation, no special precautions need be taken during the addition of the dialkoxydiacyloxysilane, if added, and the organotriacyloxysilane and the mixture is allowed to cure immediately after the addition in the desired shape.

The room temperature vulcanizing silicone rubber compositions of the present invention are particularly adapted for caulking and sealing applications where flame retardancy is important.

In order to evaluate the flame retardant properties of the silicon rubber compositions described in the examples, a test was employed which consisted of suspending a cured strip of the silicone rubber, having dimensions of 0.5 in. by 6 in. by 0.075 in. from a metal wire in a glass chimney in a draftfree atmosphere over a blue flame (approximately 1100° C) in such a manner that the tip of this strip is suspended 1 in. into the flame. The strip is held in the flame for a period of 20 seconds, at which time the flame is removed and the time required for complete extinguishment of the flame and glow is measured. The time is recorded as the "burning time", in seconds. The test strip is then freed of loose ash and weighed to determine the "percent consumed" by the fire. A material which burned for less than 140 seconds and was no more than 50 percent consumed was considered sufficiently flame retardant.

The following examples wherein all parts are by weight unless stated to the contrary are illustrative of the practice of the present invention.

EXAMPLE 1

A liquid base polymer is prepared by mixing 100 parts of a dimethyl silanol terminated phenyl methyl polysiloxane containing 7.9 mole percent diphenyl siloxy units, 91.5 mole percent dimethyl siloxy units, a viscosity of 5,700 centistokes at 25° C, and containing 0.6 mole percent by weight dimethyl silanol units; and 15 parts of a cohydrolyzate containing 75 mole percent dimethyl siloxy units, 20 mole percent methyl siloxy units, 5 mole percent trimethyl siloxy units, 0.5 weight percent silicon-bonded hydroxyl groups, and a viscosity of about 20 centistokes at 25° C. To the 115 parts of this base polymer are added 20 parts of Dechlorane 604, 4.6 parts of a catalyst system containing about 79.5 weight percent methyl triacetoxysilane, about 19.9 weight percent di-t-butoxy diacetoxysilane and about 0.6 weight percent dibutyl tin dilaurate; 20 parts of a dimethyl siloxy treated fumed silica the silica being commercially available under the trade designation Cabosil MS-7 from Cabot Corp. and 0.5 parts of carbon black commercially available from Columbian Carbon under the trade designation Raven 30. The composition is cured by being exposed to the atmosphere for 4 days. It burns for only 1 second and less than 5 percent is consumed in the flame retardancy test.

EXAMPLE 2

Example 1 is repeated except that the 20 parts of Dechlorane 604 are replaced with 40 parts of Dechlorane plus 515 which is commercially available from Hooker Chemical and 10 parts of $Sb_2O_3$ sorbed on silica commercially available under the trade designation of Oncor 23A. Dechlorane plus 515 is outside the scope of the flame retardant used in the present invention. For instance, it contains only 65% halogen, all of which is chlorine. The composition is cured by being exposed to the atmosphere for 4 days. It burns for 3 to 4 seconds and 5 percent is consumed in the flame retardancy test.

EXAMPLE 3

A liquid base polymer is prepared by mixing 100 parts of a dimethyl silanol terminated dimethyl polysiloxane containing 99.25 mole percent dimethyl siloxy units, 0.75 mole percent dimethyl silanol units, and having a viscosity of 3,000 centistokes at 25° C, and 15 parts of a cohydrolozate containing 75 mole percent dimethyl siloxy units, 20 mole percent methyl siloxy units, 5 mole percent trimethyl siloxy units, 0.5 weight percent silicon-bonded hydroxyl groups, and a viscosity of about 20 centistokes at 25° C. To the 115 parts of this base polymer are added 40 parts of Dechlorane 604, 4.6 parts of a catalyst system containing about 79.5 weight percent methyl triacetoxysilane, about 19.9 weight percent di-t-butoxy diacetoxysilane and about 0.6 weight percent dibutyl tin dilaurate; 20 parts of a dimethyl siloxy treated fumed silica commercially available under the trade designation Cabosil MS-7 from Cabot Corp. and 0.5 parts of carbon black commercially available from Columbian Carbon under the trade designation Raven 30. The composition is cured by being exposed to the atmosphere for 4 days. It burns for only 2 seconds and between 5 and 10 percent is consumed in the flame retardancy test.

A comparison of Examples 1 and 2 clearly demonstrates that the practice of the present invention provides a flame retardant material with only one flame retardant additive and which is better than the more expensive room temperature vulcanizing silicone rubbers which employed at least two flame retardant additives. In addition, Example 3 shows that the present invention makes it possible to produce flame retardant room temperature vulcanizing silicone rubbers from methyl polysiloxane base polymers as well as from the more costly phenyl containing polysiloxane base polymers. Prior to the present invention it was generally necessary for the room temperature vulcanizing silicone to contain a base polymer having phenylsiloxy units in order to obtain a material of sufficient flame retardancy to be useful from a practical and commercial viewpoint in those environments requiring a high degree of flame retardancy.

What is claimed is:

1. Composition convertible to the solid, cured elastic state upon exposure to moisture comprising
   A. a substantially liquid organopolysiloxane having a viscosity of from 200 to 500,000 centistokes containing an average of from 1.85 to 2.02 silicon-bonded organic groups per silicon atom, and containing from 0.02 to 2.0 mole percent silicon-bonded hydroxyl and/or alkoxy groups;
   B. an organotriacyloxysilane or an organosilicate having the formula, $$R''Si(OY)_3$$

wherein $R''$ is selected from the class of monovalent hydrocarbon radicals, halogenated monovalent hydrocarbon radicals, and cyanoalkyl radicals, and Y is selected from the class of a saturated aliphatic monoacyl radical of a carboxylic acid and an alkyl radical; and
   C. an effective flame retardant amount of a halogenated organic compound containing a ratio of 4 bromine atoms to 6 chlorine atoms, and a total halogen content of about 76.9 weight percent, said flame retardant being an adduct of $Cl_6C_5$ containing at least one bromine substituted aromatic ring and being a white, free-flowing crystalline powder, having a melting point of 179°C, a density of 2.37 gm/cc at 20°C, a vapor pressure of 0.0014 mm Hg at 139°C, and the following solubility characteristics;

| Solvent | Grams of flame retardant/100 ml of solvent at 25°C |
| --- | --- |
| Benzene | 0.23 |
| Xylene | 0.18 |
| Methylene Chloride | 0.15 |
| Heptane | Insoluble |
| Methyl Ethyl Ketone | 0.07 |
| Isopropyl Alcohol | Insoluble |
| Carbon Tetrachloride | 0.13 |
| Acetylene Tetrachloride | 0.16 |

2. The composition of claim 1 wherein said liquid organopolysiloxane is a silanol-terminated polysiloxane.

3. The composition of claim 2 wherein said polysiloxane is a silanol chain-stopped linear dimethyl polysiloxane.

4. The composition of claim 1 wherein (B) is an organotriacyloxysilane.

5. The composition of claim 4 wherein said organotriacyloxysilane is methyl triacetoxysilane.

6. The composition of claim 1 wherein (B) is present in an amount of 1.8 to 6.0 parts per 100 parts of said liquid organopolysiloxane.

7. The composition of claim 1 wherein said liquid organopolysiloxane is terminated with a tert-butoxy group.

* * * * *